United States Patent [19]

Lagoni et al.

[11] Patent Number: 5,436,667
[45] Date of Patent: Jul. 25, 1995

[54] MULTI-INPUT TELEVISION RECEIVER WITH COMBINED CLAMPING AND SYNCHRONIZING SIGNAL SEPARATION CIRCUIT

[75] Inventors: William A. Lagoni; Enrique Rodriguez-Cavazos, both of Indianapolis, Ind.; Karl R. Koblitz, Meylan, France

[73] Assignee: Thomson Consumer Electronics, Inc., Indianapolis, Ind.

[21] Appl. No.: 306,807

[22] Filed: Sep. 14, 1994

Related U.S. Application Data

[63] Continuation of Ser. No. 947,119, Sep. 17, 1992, abandoned.

[51] Int. Cl.$^6$ .................................. H04N 5/08
[52] U.S. Cl. ......................... 348/525; 340/500
[58] Field of Search .................. 348/525, 500; H04N 5/08, 5/16, 5/18

[56] References Cited

U.S. PATENT DOCUMENTS

| | | | |
|---|---|---|---|
| 3,573,555 | 4/1971 | Lipnitz | 361/94 |
| 4,081,833 | 3/1978 | Akiyama | 358/153 |
| 4,663,668 | 5/1987 | Rabii et al. | 358/171 |

FOREIGN PATENT DOCUMENTS

| | | | |
|---|---|---|---|
| 0260329A1 | 3/1988 | European Pat. Off. | H04N 9/64 |
| 63-318870 | 12/1988 | Japan | H04N 5/08 |
| 1174071 | 7/1989 | Japan | H04N 5/08 |
| 2264570 | 10/1990 | Japan | H04N 5/08 |
| 2181021 | 4/1987 | United Kingdom | H04N 5/185 |

Primary Examiner—James J. Groody
Assistant Examiner—Cheryl Cohen
Attorney, Agent, or Firm—Joseph S. Tripoli; Peter M. Emanuel; Richard G. Coalter

[57] ABSTRACT

A television receiver embodying the invention includes a plurality of luminance signal sources, each capacitively coupled to an input of a luminance signal selection switch and each capacitor being coupled to a respective clamp circuit with each clamp circuit having a reference voltage input coupled to a common reference voltage source. A sync separator is provided having a first input coupled to receive the output of luminance signal selection switch and a second input coupled to a source of reference potential derived from said reference voltage source. Advantageously, the overall number of clamp circuits is minimized by merging the sync separator circuit with the input signal selection clamping circuit.

2 Claims, 2 Drawing Sheets

MULTI-INPUT TELEVISION RECEIVER WITH COMBINED CLAMPING AND SYNCHRONIZING SIGNAL SEPARATION CIRCUIT

CROSS REFERENCE TO RELATED APPLICATIONS

This is a continuation of U.S. application Ser. No. 07/947,119 filed Sep. 17, 1992, now abandoned.

FIELD OF THE INVENTION

This invention relates to television receivers and particularly to receivers with plural video inputs and with clamp circuits for equalizing video levels when switching between different sources and with a synchronizing signal separation circuit for separating a horizontal synchronizing signal from the video input signal selected for display.

BACKGROUND OF THE INVENTION

Television receivers having separate inputs for RF video sources, for auxiliary baseband composite video sources and for auxiliary component sources (e.g., SVHS) are known. To avoid picture flashing when switching between different sources (due to DC level differences) it is common to clamp the various sources of a common reference voltage level prior to switching. Subsequent processing of the selected video luminance component requires synchronizing signal separation and, typically, this also involves additional clamping to ensure proper operation of the sychnronizing signal separator.

FIG. 3 herein shows an example of such a separation circuit. As shown, the input clamps comprises a pair of capacitors 302 and 304 for coupling the luminance signals Y1 and Y2 to respective inputs of a video selection switch 312. A reference voltage source (shown as a battery) 310 is coupled to the switch inputs via a pair of, so-called, "sync-tip" clamp diodes 306 and 308 whereby the luminance input signals Y1 and Y2 are clamped to a sync tip level to about the potential of the reference. The syncronizing signal separator 314 includes a clamp 316 provided with a reference voltage by source 318. The reference voltage of source 318 is offset by another reference voltage 320. A comparator 322 compares the clamped video provided by clamp 316 with the offset reference voltage from source 320 to provide a separated composite synchronizing output signal.

SUMMARY OF THE INVENTION

The present invention resides, in part, in the recognition of a need for simplification of clamping and sync separation in multi-input television receivers. To this end, the luminance signal clamping in the present invention is combined with the sync separation thereby reducing the number of required clamp circuits. For a two input luminance switch, the number of clamp circuits is reduced from three to two. In general, for an N-input luminance switch, the number of clamp circuits equals N for the combined clamping and syncronizing signal separation functions.

A television receiver embodying the invention includes a plurality of luminance signal sources, each capacitively coupled to an input of a luminance signal selection switch and each capacitor being coupled to a respective clamp circuit, each clamp circuit having a reference voltage input coupled to a common reference voltage source. A synchronizing signal separator is provided having a first input coupled to receive the output of luminance signal selection switch and a second input coupled to a source of reference potential derived from said reference voltage source.

In accordance with a further feature of the invention, the clamp circuits are of the "duty cycle" type. The duty cycle clamp is preferred over the "sync-tip" type of clamp shown in FIG. 3 because it is less sensitive to variations in sync tip amplitude. It is preferred over the keyed back porch clamp because it is less complex but still yields comparable performance.

BRIEF DESCRIPTION OF THE DRAWING

The invention is illustrated in the accompanying drawing wherein.

DETAILED DESCRIPTION

Figure 1:
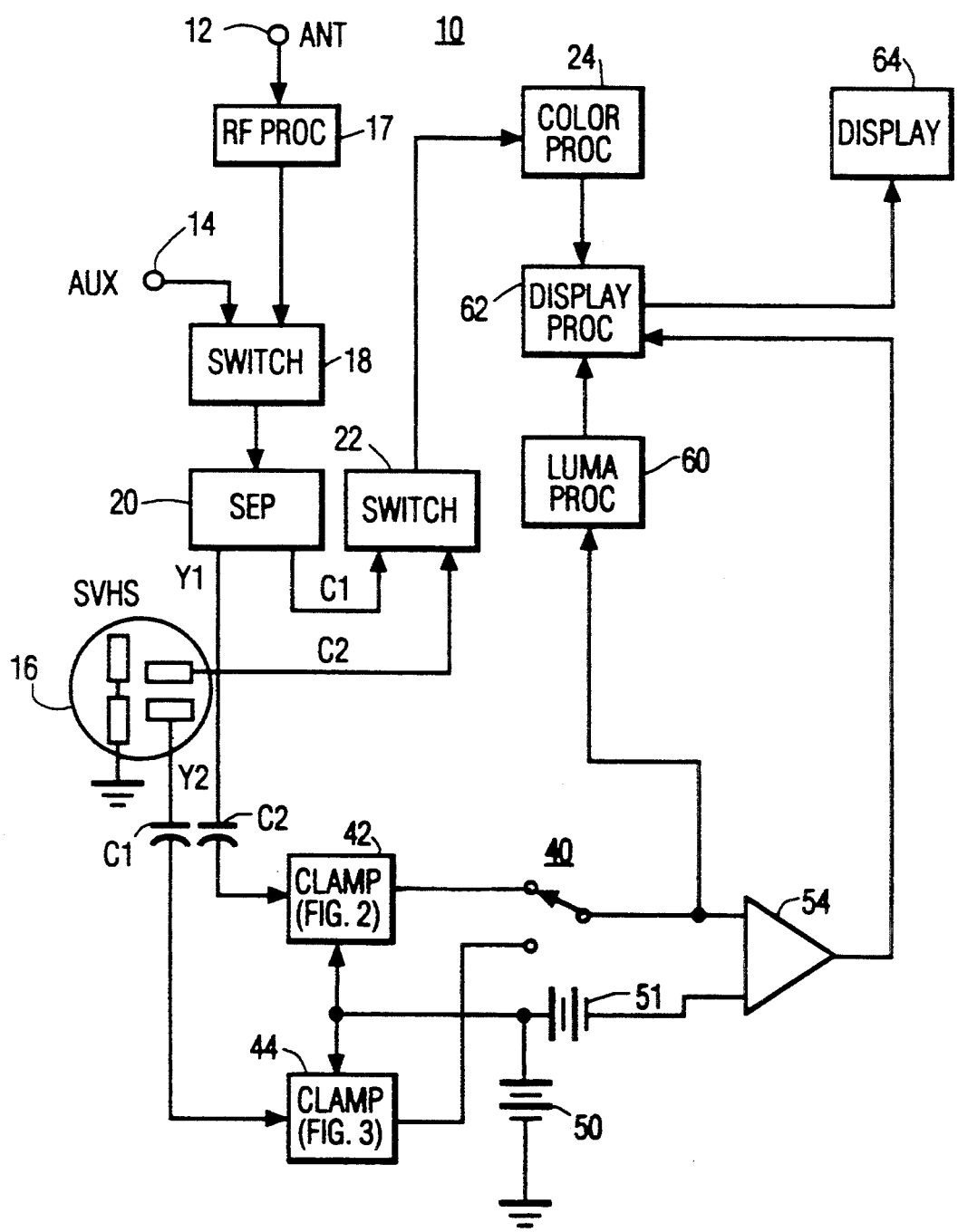
FIG. 1 is a block diagram of a multi-input television receiver including combined clamp and syncronizing signal separator embodying the invention.

The receiver 10 of FIG. 1 includes an RF input terminal 12 for connection to a cable or antenna source, an auxiliary input terminal 14 for connection to a source of baseband composite video signals and an SVHS input connector 16 for connection to a source of separated luminance and chrominance signals. The RF input terminal 12 is applied to an RF processing unit 17 which produces a baseband composite video output signal. A switch 18 selects either the auxiliary input signal or the output of the RF processing unit and applies the selected signal to a luminance chrominance signal separator 20. Another switch 22 selects the chrominance signal C1 of unit 20 as the chrominance signal C2 of the SVHS input connector for application to a color processing unit 24. The luminance output Y1 of the separator 20 and the luminance signal Y2 of the SVHS connector 16 are AC coupled via respective capacitors C1 and C2 to respective inputs of a luminance selection switch. The switch inputs are also applied to respective clamps 42 and 44 provided with a common reference voltage from a reference voltage source 50 (illustrated by a battery). The output of switch 40 is applied to a luminance signal processor and its output along with that of the color signal processor 24 are applied to a display processor 62 which performs conventional functions (e.g., matrixing, etc) and supplies a video output signal to a display 64 for displaying images of the selected video signal. Detection of the synchronizing signal is provided by a comparator that compares the output of switch 40 with an offset voltage (provided by battery 51) that is offset from the main reference voltage source 50. The resultant composite syncronizing signal is supplied to the display processor for providing various timing functions, e.g., for deflection control.

Figure 3:
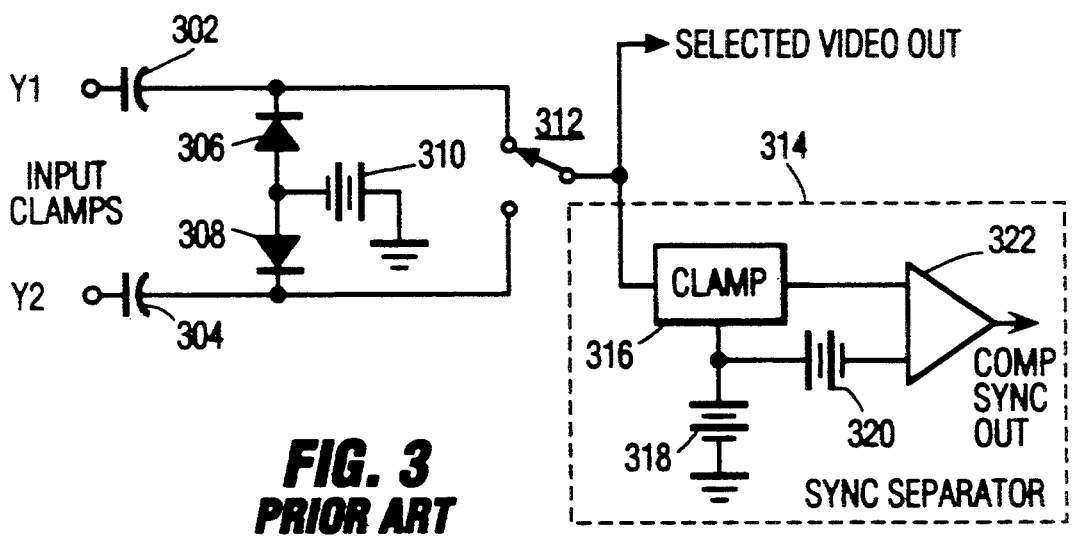
FIG. 3 is a block diagram of a known plural input clamp and syncronizing signal separation circuit.

In operation, the need for additional clamping for the synchronizing signal separator is eliminated by "merging" so-to-speak the clamping and synchronizing signal separation functions. Advantageously, this eliminates the need for a clamp circuit as compared with the prior art arrangement of FIG. 3 previously discussed.

Figure 2:
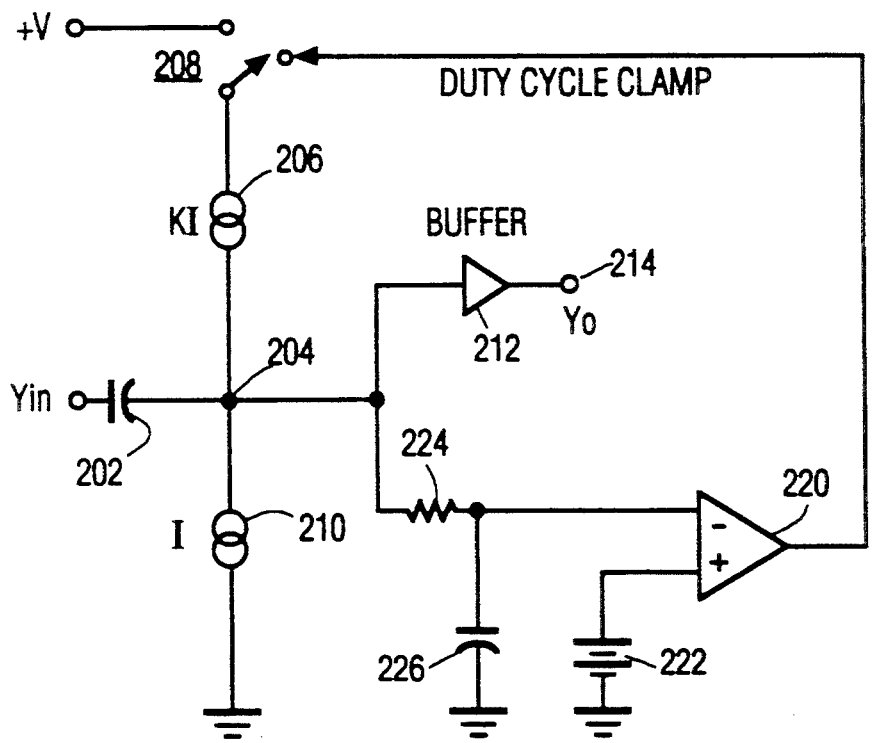
FIG. 2 is a block diagram of a preferred implementation of clamp circuits used in the embodiment of FIG. 1.

FIG. 2 is exemplary of a preferred clamp circuit. As previously explained, this circuit (a duty cycle clamp) is more accurate than so-called "sync tip" clamps and is less complicated than back porch keyed clamps. As shown, a luminance input signal Yin is applied via a capacitor 202 to a circuit node 204 that is either charged by a current source 206 in series with a switch to a source of positive supply voltage or discharged by another current source 210. The current of source 206 is K times as large as the current of source 210. Node 204 is coupled via a buffer amplifier 212 to an output 214 for providing a clamped luminance output signal Yo. Control of switch 208 (which determines the clamping level) is provided by a comparator 220 which compares a clamp reference voltage provided by source 222 with the voltage at node 204 smoothed by a low pass RC filter 224/226.

In operation the comparator senses the difference between blanking interval and active video interval (at equilibrium). By choosing the proper ratio K of the currents to approximately equal the blanking to scan time interval ratio, negative feedback is employed to cause the circuit to settle to a value wherein the blanking level is substantially equal to the reference voltage of source 222. The ratio K is selected by choosing a value greater than the line time divided by the synchronizing signal "tip" time and which is lesser than the line time divided by the blanking interval time.

What is claimed is:

1. A television receiver, comprising:
    a potential source (50,51) having a first output terminal for providing a first reference voltage and having a second output terminal for providing a second reference voltage, said second reference voltage being derived from said first reference voltage;
    a plurality of luminance signal sources (16,20) for providing respective luminance signals;
    each said source being capacitively coupled via a respective capacitor (C1,C2) to a respective input of a luminance signal selection switch (40), said switch having an output terminal for providing a selected luminance signal;
    each said capacitor (C1,C2) being coupled to a respective clamp circuit (44,42);
    each clamp circuit having a reference voltage input connected to said first output terminal of said potential source for receiving said first reference voltage provided by said reference voltage source;
    a synchronizing signal separator comprising a comparator (54) having a first input directly connected without clamping to said output terminal of said signal selection switch for receiving said selected luminance signal and having a second input connected to said second output terminal of said potential source for receiving said second reference voltage derived from said first reference voltage; and having an output terminal for providing a horizontal synchronizing signal; and
    video signal processing and display means (60,62,64) having a first input coupled to said output terminal of said switch means for receiving said selected luminance signal and having a second input coupled to said output terminal of said comparator for receiving said horizontal synchronizing signal for displaying said output of said luminance signal selection switch in synchronism with said horizontal synchronizing signal provided by said comparator.

2. A television receiver as recited in claim 1 wherein each of said clamp circuits comprises a respective clamp circuit of the duty-cycle type.

* * * * *